United States Patent
Ishibashi et al.

(10) Patent No.: US 12,065,160 B2
(45) Date of Patent: Aug. 20, 2024

(54) AWAKENING SUPPORT DEVICE AND AWAKENING SUPPORT METHOD

(71) Applicant: Panasonic Intellectual Property Management Co., Ltd., Osaka (JP)

(72) Inventors: Tomoka Ishibashi, Osaka (JP); Kazuhiko Maeda, Osaka (JP); Koumei Kubota, Kyoto (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 135 days.

(21) Appl. No.: 18/075,914

(22) Filed: Dec. 6, 2022

(65) Prior Publication Data
US 2023/0202506 A1 Jun. 29, 2023

(30) Foreign Application Priority Data
Dec. 27, 2021 (JP) .................. 2021-212886

(51) Int. Cl.
*B60W 50/16* (2020.01)
*B60W 40/08* (2012.01)
B60W 50/14 (2020.01)

(52) U.S. Cl.
CPC .......... *B60W 50/16* (2013.01); *B60W 40/08* (2013.01); *B60W 2040/0827* (2013.01); *B60W 2050/143* (2013.01); *B60W 2050/146* (2013.01); *B60W 2540/229* (2020.02)

(58) Field of Classification Search
CPC ............... B60W 50/16; B60W 40/08; B60W 2040/0827; B60W 2050/143; B60W 2050/146; B60W 2540/229
See application file for complete search history.

(56) References Cited

U.S. PATENT DOCUMENTS

| | | | | |
|---|---|---|---|---|
| 11,273,826 | B2* | 3/2022 | Iwasa | B60W 10/04 |
| 2018/0268695 | A1* | 9/2018 | Agnew | B60W 50/14 |
| 2019/0056732 | A1* | 2/2019 | Aoi | G08B 21/06 |
| 2020/0039468 | A1* | 2/2020 | Narumi | G08B 21/06 |
| 2020/0156440 | A1* | 5/2020 | Matsuoka | G06V 20/58 |
| 2020/0216095 | A1 | 7/2020 | Isozaki et al. | |
| 2020/0247422 | A1* | 8/2020 | Yoshida | A61M 21/00 |
| 2020/0276978 | A1 | 9/2020 | Satou et al. | |

(Continued)

FOREIGN PATENT DOCUMENTS

| | | |
|---|---|---|
| JP | 2018-151752 | 9/2018 |
| JP | 2019-074791 | 5/2019 |
| JP | 2020-052482 | 4/2020 |

(Continued)

*Primary Examiner* — Mohamed Barakat
(74) *Attorney, Agent, or Firm* — GREENBLUM & BERNSTEIN, P.L.C.

(57) ABSTRACT

An awakening support device promotes awakening of a driver. The awakening support device includes: a vehicle state determiner that determines whether a vehicle of the driver is traveling or stopped; and a stimulus controller that controls a stimulus generation device that generates a stimulus used for supporting the awakening of the driver based on a result of determination by the vehicle state determiner. The stimulus controller causes the stimulus generation device to generate a stimulus more intense than a stimulus generated when the vehicle is determined to be traveling, when the vehicle state determiner determines that the vehicle is stopped.

20 Claims, 11 Drawing Sheets

(56) References Cited

U.S. PATENT DOCUMENTS

2021/0291838 A1* 9/2021 Tamilarasan .......... G06V 40/18

FOREIGN PATENT DOCUMENTS

| WO | 2018/163532 | 9/2018 |
| WO | 2019/069999 | 4/2019 |
| WO | 2019/073708 | 4/2019 |
| WO | 2020/066757 | 4/2020 |
| WO | 2021/079953 | 4/2021 |

* cited by examiner

FIG. 2

| Stimulus for use | Parameter | Weak | Intense |
|---|---|---|---|
| Only sound | Sound pressure | Lower than 60 dB | Higher than 80 dB |
| | Tempo (or pace) | Lower than 120 bpm | Higher than 180 bpm |
| | Lyrics | Absence | Presence |
| Only vibration | Penetration depth | Smaller than 3 cm | Greater than 6 cm |
| | Frequency | Lower than 70 Hz | Higher than 100 Hz |
| | Part | Back of left knee | Whole seat |
| Only light | Illuminance | None | 1000 Lx |
| | Color temperature | None | 12000 K |
| Only aroma (peppermint, etc.) | Concentration | Lower than 10% | Higher than 20% |
| | Frequency of spraying | 1 time/m | 4 times/m or more |
| Only blow | Air speed | Lower than 2 m/s | Higher than 4 m/s |
| | Air temperature | 25°C | 20°C |
| | Part | Neck | Neck and face |

FIG. 3

| Weak | Intense |
|---|---|
| Sound | Conversation |
| Sound | Sound and operation |
| Sound | Sound and vibration |
| Sound | Sound and light |
| Aroma | Aroma and sound |
| Blow | Blow and sound |
| Vibration | Vibration and light |
| Aroma | Aroma and vibration |
| Blow | Blow and vibration |
| ... | |

|  |  | Stopped | Traveling |
|---|---|---|---|
| Sleepiness Level | 1 | No stimulus | No stimulus |
|  | 2 | Weak | No stimulus |
|  | 3 | Weak | No stimulus |
|  | 4 | Intense | Weak |
|  | 5 | Intense | Weak |

| Conditions | | | Time |
|---|---|---|---|
| Default | | | 15 seconds |
| Intensity of stimulus | | Intense | 10 seconds |
| | | Weak | 3 seconds |
| Type of stimulus | | Aroma, light | 15 seconds |
| | | Others | 10 seconds |
| External information | Traffic | Heavy | 10 seconds |
| | | Light | 3 seconds |
| | Size of blind spot | ... | |
| | Accident rate | ... | |
| | ... | | |
| Internal information | Degree of distraction | High (not concentrating) | 10 seconds |
| | | Low (concentrating) | 3 seconds |
| | Stress | ... | |
| | ... | | |

AWAKENING SUPPORT DEVICE AND AWAKENING SUPPORT METHOD

CROSS REFERENCE TO RELATED APPLICATION

The present application is based on and claims priority of Japanese Patent Application No. 2021-212886 filed on Dec. 27, 2021.

FIELD

The present disclosure relates to an awakening support device and an awakening support method that promote the awakening of a driver.

BACKGROUND

A vehicle driver needs to be sufficiently awake while driving a vehicle. To meet the need, a device that awakens a driver from sleepiness, in other words, an awakening support device that promotes the awakening of a driver is suggested (see, e.g., Patent Literature (PTL) 1).

The awakening support device disclosed PTL 1 causes a stimulus generation device capable of generating several types of stimuli to generate a stimulus selected based on the environment around a vehicle driver and efficiently promotes the awakening of the driver, when the vehicle driver is determined to be sleepy.

CITATION LIST

Patent Literature

PTL 1: Japanese Unexamined Patent Application Publication No. 2018-151752

SUMMARY

However, the awakening support device disclosed in above-described PTL 1 can be improved. The present disclosure provides an awakening support device, for example, capable of improving upon the above related art.

The present disclosure was made in view of the circumstances described above and provides an awakening support device, for example, capable of efficiently promoting the awakening of the driver, while ensuring the safety.

An awakening support device according to an aspect of the present disclosure promotes awakening of a driver. The awakening support device includes: a vehicle state determiner that determines whether a vehicle of the driver is traveling or stopped; and a stimulus controller that controls a stimulus generation device that generates a stimulus used for supporting the awakening of the driver based on a result of determination by the vehicle state determiner. When the vehicle state determiner determines that the vehicle is stopped, the stimulus controller causes the stimulus generation device to generate a first stimulus more intense than a second stimulus generated when the vehicle is determined to be traveling.

Note that the general and specific aspect of the present disclosure may be implemented using a system, a method, an integrated circuit, a computer program, or a computer-readable recording medium, such as a compact disc read-only memory (CD-ROM), or any combination of systems, methods, integrated circuits, computer programs, or recording media.

A further improvement can be expected in the awakening support device, for example, according to an aspect of the present disclosure.

BRIEF DESCRIPTION OF DRAWINGS

These and other advantages and features of the present disclosure will become apparent from the following description thereof taken in conjunction with the accompanying drawings that illustrate specific embodiments of the present disclosure.

FIG. 2 shows example types of stimuli and parameters for generating the stimuli according to Embodiment 1.

FIG. 3 shows an example relationship between a variation in the type of a stimulus and a change in the intensity of the stimulus according to Embodiment 1.

DESCRIPTION OF EMBODIMENTS

The embodiments described below are mere specific examples of the present disclosure. The numerical values, shapes, constituent elements, steps, step orders etc. shown in the following embodiments are thus mere examples, and are not intended to limit the scope of the present disclosure. Among the constituent elements in the following embodiments, those not recited in the independent claims will be described as optional. The contents of all the embodiments may be combined.

Embodiment 1

An awakening support device, for example, according to an embodiment will be described below with reference to the drawings.

1. Configuration of System

Figure 1:
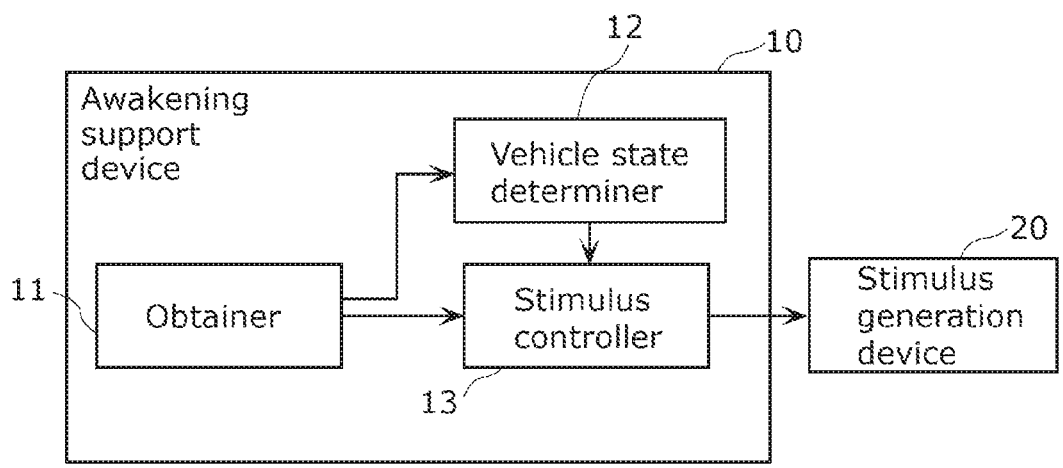
FIG. 1 shows an example configuration of a system according to Embodiment 1.

FIG. 1 shows an example configuration of a system according to Embodiment 1.

The system shown in FIG. 1 includes awakening support device 10 and stimulus generation device 20, and is typically mounted on a vehicle.

1.1. Vehicle

The vehicle according to Embodiment 1 is an automobile, a motorcycle, or a bicycle of a driver who is a target to be supported by awakening support device 10.

The vehicle according to Embodiment 1 includes cameras and a communication device for obtaining out-of-vehicle information. The cameras and communication device are connected to an on-vehicle network, such as a controller area network (CAN). The vehicle according to Embodiment 1 may further include sensors that obtain internal information, such as biological information on the driver of the vehicle.

While being information (surrounding environment information) related to the surrounding environment of the vehicle, for example, the out-of-vehicle information is not limited thereto. The out-of-vehicle information may include information obtained from a traffic light in the travelling direction of the vehicle, information obtained from a railroad crossing in the travelling direction of the vehicle, and information on other vehicles in the travelling direction of the vehicle.

1.2. Stimulus Generation Device 20

Stimulus generation device 20 generates a stimulus used for supporting the awakening of the driver. The stimulus generated by stimulus generation device 20 is at least one of a blow, a sound, a vibration, an aroma, or light and used to stimulate the five senses of the driver and promote the awakening of the driver. Note that the stimulus may be causing the driver to perform a specific operation or specific handling.

In this embodiment, stimulus generation device 20 is controlled by stimulus controller 13 of awakening support device 10 to generate a stimulus in the form of at least one of a blow, a sound, a vibration, an aroma, or light, to stop generating the stimulus, and to change the intensity of the generated stimulus. Examples of the stimulus in the form of a vibration include a seat vibration of vibrating protrusions inside a seat of the vehicle. The stimulus in the form of a vibration is not limited thereto but may be a vibration of a steering wheel.

Stimulus generation device 20 may change the intensity of the stimulus by changing the type of the stimulus to be generated, under the control of stimulus controller 13 of awakening support device 10.

Note that stimulus generation device 20 may be included in awakening support device 10.

1.3. Awakening Support Device 10

Awakening support device 10 is for promoting the awakening of a driver.

As shown in FIG. 1, awakening support device 10 includes obtainer 11, vehicle state determiner 12, and stimulus controller 13. Note that awakening support device 10 may further include stimulus generation device 20.

Obtainer 11 obtains out-of-vehicle information from cameras and a communication device of a vehicle, on which awakening support device 10 is mounted, and in-vehicle information from a network mounted on the vehicle. In-vehicle information includes the vehicle speed, for example, and may be referred to as "CAN information".

Vehicle state determiner 12 determines whether a vehicle of a driver is traveling (in a traveling state) or stopped (in a stopped state).

In this embodiment, vehicle state determiner 12 determines whether the vehicle of the driver is traveling or stopped based on the CAN information obtained by obtainer 11. For example, vehicle state determiner 12 determines that the vehicle is stopped (in a stopped state) when the vehicle speed indicated by the CAN information is zero, and determine that the vehicle is traveling (in a traveling state) when the vehicle speed indicated by the CAN information is not zero. Note that vehicle state determiner 12 may determine that the vehicle is stopped (in a stopped state) when the vehicle speed indicated by the CAN information is lower than or equal to a threshold, and determine that the vehicle is traveling (in a traveling state) when the vehicle speed indicated by the CAN information is higher than the threshold.

Stimulus controller 13 includes a computer including a memory and a processor (microprocessor), for example. The processor executes control programs stored in the memory so that stimulus controller 13 causes stimulus generation device 20 to fulfill various functions.

In this embodiment, stimulus controller 13 controls stimulus generation device 20 based on the result of determination by vehicle state determiner 12. When vehicle state determiner 12 determines that the vehicle is stopped, stimulus controller 13 causes stimulus generation device 20 to generate a stimulus more intense than a stimulus generated when the vehicle is determined to be traveling.

Stimulus controller 13 instructs stimulus generation device 20 to change a parameter for generating a stimulus, such as a blow, a sound, a vibration, an aroma, or light, thereby causing stimulus generation device 20 to change the intensity of the stimulus.

Here, a stimulus generated when the vehicle is determined to be traveling has the intensity that causes less distraction of the driver and will also be referred to as a "weak stimulus". On the other hand, a stimulus generated when the vehicle is determined to be stopped has the intensity that tends to cause a distraction of the driver and will also be referred to as an "intense stimulus".

FIG. 2 shows example types of stimuli and parameters for generating the stimuli according to Embodiment 1. FIG. 2 shows example parameters for generating an intense or weak stimulus in the form of any one of a blow, a sound, a vibration, an aroma, or light and their values.

In the example in FIG. 2, for example, if only a sound is used as a stimulus, the parameter for generating the stimulus in the form of the sound is the sound pressure, the tempo (or pace), or the presence or absence of lyrics. In this case, stimulus controller 13 gives a parameter indicating that a sound pressure is lower than 60 dB, a tempo (or pace) is lower than 120 bpm, or there is no lyrics, as an instruction to stimulus generation device 20. With this instruction, stimulus controller 13 causes stimulus generation device 20 to generate a weak stimulus. On the other hand, stimulus controller 13 gives a parameter indicating that a sound pressure is higher than 80 dB, a tempo (or pace) is higher than 180 bpm, or there are lyrics, as an instruction to stimulus generation device 20. With this instruction, stimulus controller 13 causes stimulus generation device 20 to generate an intense stimulus.

In the example in FIG. 2, for example, if only a vibration, such as a seat vibration, is used as a stimulus, the parameter for generating a stimulus in the form of the vibration is a pushing depth, a frequency, or a part to be vibrated. In this case, stimulus controller 13 gives a parameter indicating that a pushing depth is smaller than 3 cm, a frequency is lower than 70 Hz, or the back of the left knee is to be vibrated, as an instruction to stimulus generation device 20. With this instruction, stimulus controller 13 causes stimulus generation device 20 to generate a weak stimulus. On the other hand, stimulus controller 13 gives a parameter indicating that a pushing depth is greater than 6 cm, a frequency is higher than 100 Hz, or the whole seat is to be vibrated, as an instruction to stimulus generation device 20. With this instruction, stimulus controller 13 causes stimulus generation device 20 to generate an intense stimulus.

In the example in FIG. 2, for example, if only light is used as a stimulus, the parameter for generating a stimulus in the form of the light is the illuminance or the color temperature. In this case, stimulus controller 13 gives a parameter indicating that an illuminance is zero ("None") or a color temperature is zero ("None"), as an instruction to stimulus generation device 20. With this instruction, stimulus controller 13 causes stimulus generation device 20 to generate a weak stimulus, that is, not to generate light. On the other hand, stimulus controller 13 gives a parameter indicating that an illuminance is 1000 Lx or a color temperature is 12000 K, as an instruction to stimulus generation device 20. With this instruction, stimulus controller 13 causes stimulus generation device 20 to generate an intense stimulus.

In the example in FIG. 2, for example, if only an aroma, such as peppermint, is used as a stimulus, the parameter for generating a stimulus in the form of the aroma is the concentration of a liquid to be sprayed and containing an aroma component, or a spraying frequency. In this case, stimulus controller 13 gives a parameter indicating that a concentration is lower than 10% or the liquid is sprayed once a minute (m), as an instruction to stimulus generation device 20. With this instruction, stimulus controller 13 causes stimulus generation device 20 to generate a weak stimulus, that is, not to generate an aroma. On the other hand, stimulus controller 13 gives a parameter indicating that a concentration is higher than 20% or the liquid is sprayed four times a minute (m), as an instruction to stimulus generation device 20. With this instruction, stimulus controller 13 causes stimulus generation device 20 to generate an intense stimulus.

In the example in FIG. 2, for example, if only a blow is used as a stimulus, the parameter for generating a stimulus in the form of the blow is the air speed, the air temperature, and a part to be blown. In this case, stimulus controller 13 gives a parameter indicating that an air speed is lower than 2 m/s, an air temperature is 25° C., or the neck is to be blown, as an instruction to stimulus generation device 20. With this instruction, stimulus controller 13 causes stimulus generation device 20 to generate a weak stimulus. On the other hand, stimulus controller 13 gives a parameter indicating that an air speed is higher than 4 m/s, an air temperature is 25° C., or the neck and face is to be blown, as an instruction to stimulus generation device 20. With this instruction, stimulus controller 13 causes stimulus generation device 20 to generate an intense stimulus.

As shown in FIG. 2, stimulus controller 13 gives an instruction to change the parameter for generating a stimulus to stimulus generation device 20, thereby causing stimulus generation device 20 to change the intensity of the stimulus.

Examples have been described where stimulus controller 13 performs the control of change the intensity of the stimulus to be generated by stimulus generation device 20 by changing a parameter for generating one type of a stimulus, such as only a sound. The control is however not limited thereto. Stimulus controller 13 may change the intensity of the stimulus by changing the type of the stimulus to be generated by stimulus generation device 20.

FIG. 3 shows an example relationship between a variation in the type of a stimulus and a change in the intensity of the stimulus according to Embodiment 1.

As shown in the first row of FIG. 3, for example, a sound including no conversation may be generated as a weak stimulus, while a sound including a conversation may be generated as an intense stimulus. More specifically, for example, stimulus controller 13 may give a parameter indicating that a stimulus is a sound, such as instrumental music, including no conversation, as an instruction to stimulus generation device 20. With this instruction, stimulus controller 13 may cause stimulus generation device 20 to generate a weak stimulus. This is because a sound, such as instrumental music, including no conversation draws less attention of the driver. On the other hand, stimulus controller 13 gives a parameter indicating that a stimulus is a sound including a conversation, as an instruction to stimulus generation device 20. With this instruction, stimulus controller 13 causes stimulus generation device 20 to generate an intense stimulus.

As shown in the second row of FIG. 3, for example, only a sound may be generated as a weak stimulus, while the driver may be caused to perform a predetermined operation in addition to the generation of the sound as an intense stimulus. More specifically, for example, stimulus controller 13 gives a parameter indicating that the stimulus is only a sound, as an instruction to stimulus generation device 20. With this instruction, stimulus controller 13 may cause stimulus generation device 20 to generate a weak stimulus. In this case, stimulus controller 13 gives a parameter indicating that the stimulus is causing the driver to perform a predetermined operation in addition to the generation of the sound, as an instruction to stimulus generation device 20. With this instruction, stimulus controller 13 may cause stimulus generation device 20 to generate the sound and a sound to notify the driver of a need to perform the predetermined operation and cause the driver to perform the predetermined operation. The predetermined operation is a gesture, for example, but may be an operation requiring specific handling or uttering a specific word, as long as being an active operation by the driver. In this manner, stimulus controller 13 causes stimulus generation device 20 to generate an intense stimulus.

As shown in the third row of FIG. 3, for example, only a sound may be generated as a weak stimulus, while the sound and a vibration may be generated as an intense stimulus at the same time. More specifically, for example, stimulus controller 13 gives a parameter indicating that the stimulus is only a sound, as an instruction to stimulus generation device 20. With this instruction, stimulus controller 13 may cause stimulus generation device 20 to generate a weak stimulus. In this case, stimulus controller 13 gives a parameter indicating that the stimulus is generating the sound and a vibration at the same time, as an instruction to stimulus generation device 20. With this instruction, stimulus controller 13 may cause stimulus generation device 20 to generate an intense stimulus.

Similarly, as shown in the fourth and fifth rows of FIG. 3, for example, only a sound may be generated as a weak stimulus, while the sound and light may be generated as an intense stimulus at the same time. Alternatively, only an aroma may be generated as a weak stimulus, while the aroma and a sound may be generated as an intense stimulus at the same time. As shown in the fifth and six rows of FIG. 3, for example, a blow may be given as a weak stimulus, while the blow and a sound may be generated as an intense stimulus at the same time. Alternatively, only a vibration may be generated as a weak stimulus, while the vibration and light may be generated as an intense stimulus at the same time. As shown in the seventh and eighth rows of FIG.

3, for example, only an aroma may be generated as a weak stimulus, while the aroma and a vibration may be generated as an intense stimulus at the same time. Alternatively, only a blow may be generated as a weak stimulus, while the blow and a vibration may be generated as an intense stimulus at the same time. Note that the combinations of weak and intense stimuli are not limited to the examples shown in FIG. 3 and may be other combinations. For example, a weak stimulus may be generating one type of a stimulus out of various stimuli, while an intense stimulus may generate two or more types of stimuli that stimulate two or more of five senses. A weak stimulus may include a combination of a plurality of stimuli as long as not causing a distraction. In addition, combinations of weak and intense stimuli may include a variation in the type of a stimulus. For example, a weak stimulus may be generating only a sound, while an intense stimulus is generating a hard vibration.

1.4. Operation of Awakening Support Device 10

Next, an operation of awakening support device 10 described above will be described.

Figure 4:
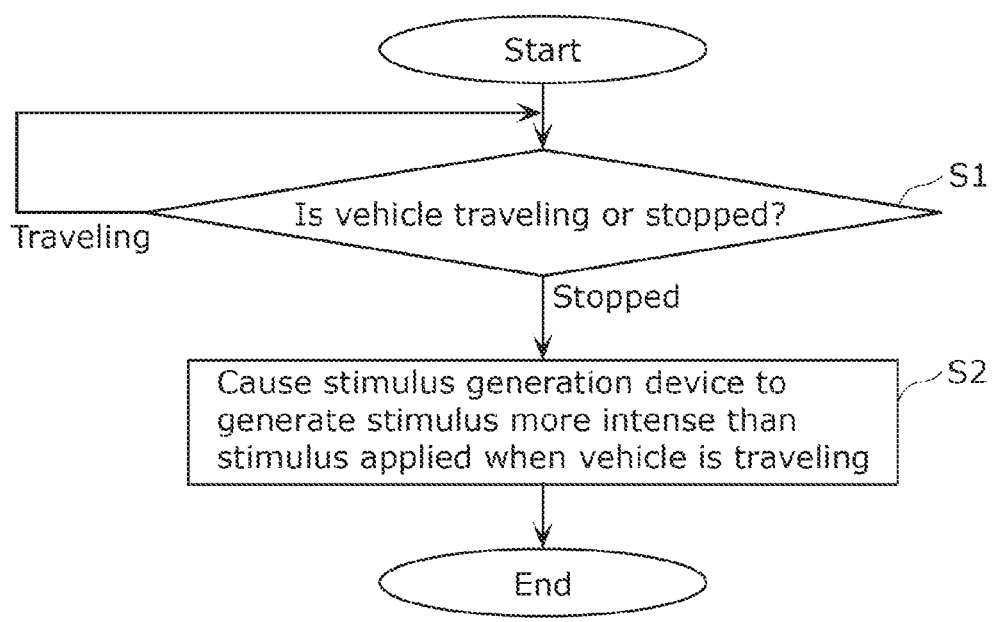
FIG. 4 is a flowchart showing an example operation of an awakening support device according to Embodiment 1.

FIG. 4 is a flowchart showing an example operation of awakening support device 10 according to Embodiment 1.

First, awakening support device 10 determines whether a vehicle of a driver is traveling or stopped (S1). More specifically, vehicle state determiner 12 of awakening support device 10 determines whether the vehicle of the driver is traveling or stopped based on CAN information, such as the vehicle speed, obtained by obtainer 11 from a network mounted on the vehicle.

If the vehicle is determined to be stopped in step S1 ("Stopped" in S1), awakening support device 10 causes stimulus generation device 20 to generate a stimulus (the intense stimulus described above) more intense than a stimulus generated when the vehicle is traveling (S2). More specifically, if vehicle state determiner 12 determines that the vehicle is stopped, stimulus controller 13 of awakening support device 10 causes stimulus generation device 20 to generate a stimulus more intense than a stimulus generated when the vehicle is determined to be traveling.

On the other hand, if the vehicle is determined to be traveling in step S1 ("Traveling" in S1), awakening support device 10 returns to step S1 and repeats the processing.

Figure 5:
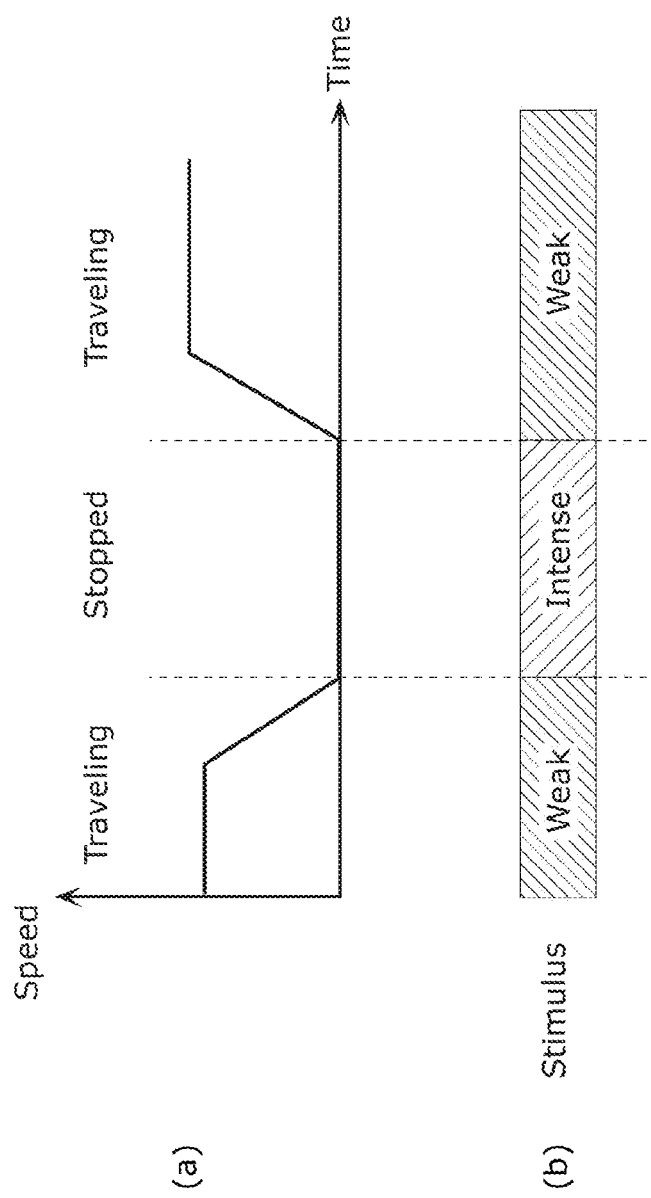
FIG. 5 is an illustration conceptually showing an operation of the awakening support device according to Embodiment 1.

FIG. 5 is an illustration conceptually showing an operation of awakening support device 10 according to Embodiment 1. In FIG. 5, (a) shows the vehicle states of a vehicle of a driver. The vertical axis represents the speed and the horizontal axis represents the time. The example in (a) of FIG. 5 will be described where the vehicle is stopped (in a stopped state) while the vehicle speed is zero, whereas the vehicle is traveling (in a traveling state) while the vehicle speed is not zero. In FIG. 5, (b) shows example intensities of a stimulus applied to the driver. Like the example described above, a stimulus with an intensity that causes less distraction is shown as "weak", while a stimulus with an intensity that tends to cause a distraction is shown as "intense".

As shown in FIG. 5, in this embodiment, when the vehicle of the driver is traveling, a weak stimulus that causes less distraction can be applied to the driver. On the other hand, when the vehicle of the driver is stopped, a stimulus that has a high awakening effect and tends to cause a distraction can be applied to the driver.

1.5. Advantageous Effects of Embodiment

A stimulus with a high awakening effect from sleepiness tends to cause a distraction (i.e., inattention) of a driver and thus may increase a danger depending on the driving conditions. On the other hand, a stimulus that causes less distraction has a lower awakening effect. By contrast, as described above, awakening support device 10 according to this embodiment applies a weak stimulus that causes less distraction to the driver in a traveling state of the vehicle of the driver. On the other hand, awakening support device 10 applies an intense stimulus that tends to cause a distraction but has a high awakening effect to the driver in a stopped state of the vehicle of the driver.

Accordingly, when the vehicle of the driver is traveling, no intense stimulus that tends to cause a distraction is applied to the driver, which can ensure the safety of the driver. On the other hand, when the vehicle of the driver is stopped, a stimulus that has a high awakening effect and tends to cause a distraction is applied to the driver, which can effectively promote the awakening of the driver. In this manner, a further improvement can be expected in the awakening support device, for example, according an embodiment of the present disclosure.

Embodiment 2

While an example has been described in Embodiment 1 where an intense stimulus is applied to a driver in a stopped state of a vehicle, the application is not limited thereto. Even in a stopped state of a vehicle, a stimulus applied to the driver may be changed to weak at a certain time before a start time period when the vehicle starts moving. Such a case will be described below as Embodiment 2. Note that differences from the description in Embodiment 1 will be described mainly.

2.1. Awakening Support Device 10A

Figure 6:
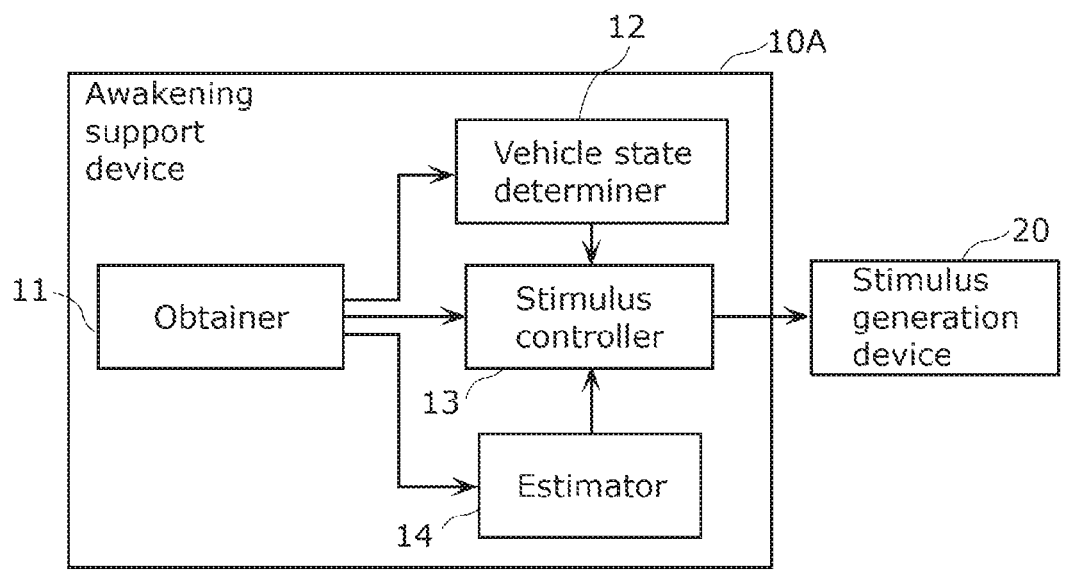
FIG. 6 shows an example configuration of an awakening support device according to Embodiment 2.

FIG. 6 shows an example configuration of awakening support device 10A according to Embodiment 2. FIG. 6 further shows stimulus generation device 20. The same reference signs are used to represent equivalent elements to those in FIG. 1 and detailed description thereof will be omitted.

As shown in FIG. 6, awakening support device 10A according to Embodiment 2 includes obtainer 11, vehicle state determiner 12, stimulus controller 13, and estimator 14. Like in Embodiment 1, awakening support device 10A may further include stimulus generation device 20.

Awakening support device 10A shown in FIG. 6 includes the configuration of estimator 14 in addition to awakening support device 10 according to Embodiment 1.

2.1.1. Obtainer 11

Figure 7:
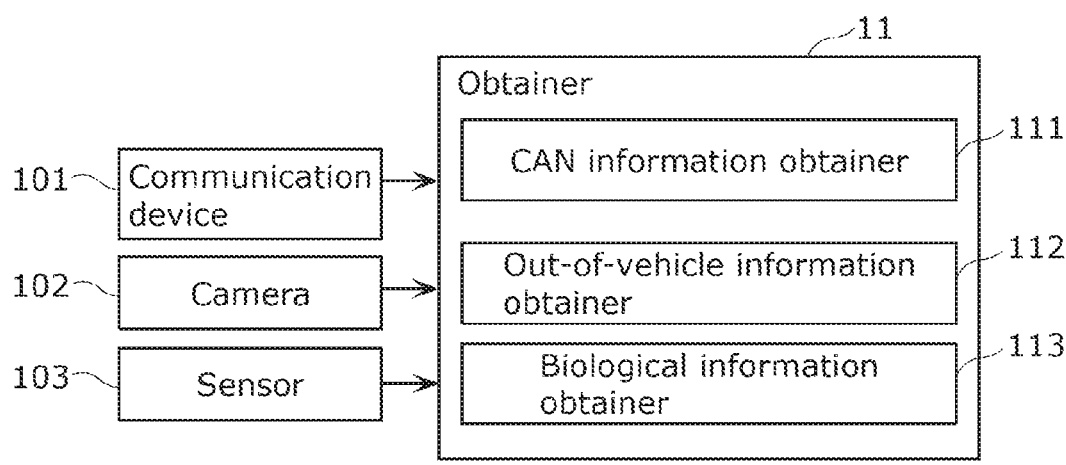
FIG. 7 shows an example detailed configuration of an obtainer shown in FIG. 6.

FIG. 7 shows an example detailed configuration of obtainer 11 shown in FIG. 6.

Note that FIG. 7 further shows a part of the configuration of a vehicle, on which awakening support device 10A is mounted, that are, communication device 101, cameras 102, and sensors 103.

Communication device 101 of the vehicle receives CAN information, such as information indicating the vehicle speed, via an on-vehicle network, and establishes inter-vehicle communications with other vehicles in the travelling direction of the vehicle to obtain information on the other vehicles. Communication device 101 of the vehicle may establish road-to-vehicle communications or vehicle-to-everything (V2X) communications with a traffic light in the travelling direction of the vehicle and a roadside unit placed at a railroad crossing to receive out-of-vehicle information. As described above, the out-of-vehicle information may include information (surrounding environment information) on the environment around the vehicle, information obtained from a traffic light in the travelling direction of the vehicle, information obtained from a railroad crossing in the travelling direction of the vehicle, and information on other vehicles in the travelling direction of the vehicle. Cameras 102 of the vehicle image the outside of the vehicle and obtain a part of the out-of-vehicle information such as the surrounding environment information. Sensors 103 of the vehicle detect the conditions of the driver. Sensors 103 of the vehicle output detection information on the detected conditions, such as the blink frequency, the opening degree of the eyes, or the eye movement, of the driver. Note that sensors 103 of the vehicle may further output detection information on the detected pulse or gaze of the driver.

In this embodiment, obtainer 11 obtains out-of-vehicle information from a vehicle, on which awakening support device 10A is mounted, CAN information from a network mounted on the vehicle, and biological information. More specifically, for example, as shown in FIG. 7, obtainer 11 includes CAN information obtainer 111, out-of-vehicle information obtainer 112, and biological information obtainer 113.

CAN information obtainer 111 obtains CAN information, such as information indicating the vehicle speed, from communication device 101 of the vehicle.

Out-of-vehicle information obtainer 112 obtains out-of-vehicle information from communication device 101 and cameras 102 of the vehicle.

Biological information obtainer 113 obtains detection information on the detected conditions of the driver from sensors 103 of the vehicle, thereby obtaining biological information indicating the conditions of the driver.

2.1.2. Vehicle State Determiner 12

Vehicle state determiner 12 determines whether the vehicle of the driver is traveling or stopped.

In this embodiment, vehicle state determiner 12 determines whether the vehicle of the driver is traveling or stopped based on the CAN information obtained by CAN information obtainer 111. For example, vehicle state determiner 12 determines that the vehicle is stopped when the vehicle speed indicated by the CAN information is zero, and that the vehicle is traveling when the vehicle speed indicated by the CAN information is not zero.

2.1.3. Estimator 14

Figures 8, 9:
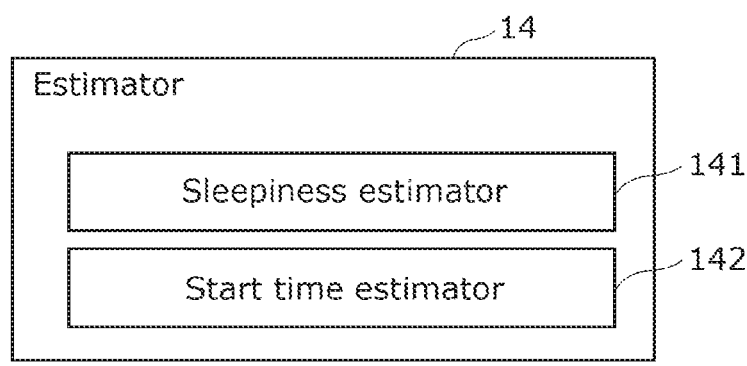
FIG. 8 shows an example detailed configuration of an estimator shown in FIG. 6.
FIG. 9 shows example intensities of a stimulus to be generated by a stimulus generation device in accordance with a sleepiness level according to Embodiment 2.

FIG. 8 shows an example detailed configuration of estimator 14 shown in FIG. 6.

For example, as shown in FIG. 8, estimator 14 includes sleepiness estimator 141 and start time estimator 142.

Sleepiness estimator 141 estimates a sleepiness level indicating the degree of sleepiness of the driver based on information on the detection by sensors that detect the conditions of the driver.

In this embodiment, sleepiness estimator 141 estimates the sleepiness level based on biological information obtained by biological information obtainer 113. For example, sleepiness estimator 141 estimates the sleepiness level indicating the degree of the sleepiness in accordance with the blink frequency of the driver indicated by the biological information, since the less frequent the driver blinks, the driver is sleepier. The same applies to the cases where the biological information is the opening degree of the eyes of the driver or the eye movement of the driver.

If vehicle state determiner 12 determines that the vehicle is stopped, start time estimator 142 estimates the start time period of the vehicle when the vehicle is ready to move for travel. More specifically, start time estimator 142 estimates the start time period based on at least one of information obtained from a traffic light in the travelling direction of the vehicle, information obtained from a railroad crossing (i.e., a roadside unit near the railroad crossing) in the travelling direction of the vehicle, or information on other vehicles in the travelling direction of the vehicle.

In this embodiment, start time estimator 142 estimates the start time period of the vehicle from the out-of-vehicle information obtained by out-of-vehicle information obtainer 112. For example, start time estimator 142 estimates the start time period when the vehicle is ready to move for travel from the out-of-vehicle information indicating the time when the gate of the railroad crossing is open, for example, in XX seconds. Start time estimator 142 also estimates the start time period when the vehicle is ready to move for travel from out-of-vehicle information indicating the movement of a traffic jam, for example, the fact that the n-th vehicle before the vehicle, which is one of other vehicles in the travelling direction of the vehicle, starts moving for travel. Start time estimator 142 also estimates the start time period when the vehicle is ready to move for travel from out-of-vehicle information indicating the time when a traffic light in the travelling direction of the vehicle changes, for example, the fact that the traffic light turns green (i.e., the color indicating that traffic may proceed) in XX seconds.

2.1.4. Stimulus Controller 13

Stimulus controller 13 includes a computer including a memory and a processor (microprocessor), for example. The processor executes control programs stored in the memory so that stimulus controller 13 controls stimulus generation device 20 to fulfill various functions.

In this embodiment, stimulus controller 13 changes the intensity of the stimulus to be generated by stimulus generation device 20 in accordance with the sleepiness level estimated by sleepiness estimator 141. Specifically, if the sleepiness level is estimated to be higher than a first threshold and the vehicle is determined to be traveling, stimulus controller 13 causes stimulus generation device 20 to generate a stimulus with a first intensity. If the sleepiness level is estimated to be higher than the first threshold and the vehicle is determined to be stopped, stimulus controller 13 causes stimulus generation device 20 to generate a stimulus more intense than the stimulus with the first intensity applied when the vehicle is determined to be traveling. Note that the stimulus with the first intensity is a weak stimulus, for example, while the "stimulus more intense than the stimulus with the first intensity" is an intense stimulus. For example, when the vehicle is determined to be traveling and the sleepiness level is estimated by sleepiness estimator 141 to be higher than the first threshold, stimulus controller 13 causes stimulus generation device 20 to generate a weak stimulus. On the other hand, for example, when the vehicle is determined to be stopped and the sleepiness level is estimated by sleepiness estimator 141 to be higher than the first threshold, stimulus controller 13 causes stimulus generation device 20 to generate a stimulus (i.e., an intense stimulus) with a higher intensity. Note that the first threshold is determined as appropriate but is "4" in the example which will be described below with reference to FIG. 9.

FIG. 9 shows example intensities of a stimulus to be generated by stimulus generation device 20 in accordance with the sleepiness level of a driver according to Embodiment 2. Here, the higher the sleepiness level, the sleepier the driver.

FIG. 9 shows that there is no need to apply a stimulus when the sleepiness level is "1" even in a stopped state of a vehicle, since the sleepiness level is low and the driver is not sleepy. FIG. 9 also shows that applying a weak stimulus suffices when the sleepiness level is "2" or "3" even in a stopped state of a vehicle, since the sleepiness level is medium and the driver is a little sleepy. On the other hand, FIG. 9 shows applying an intense stimulus when the vehicle is stopped and the sleepiness level is "4" or "5", since the sleepiness level is high and the driver is very sleepy. In this manner, stimulus controller 13 may cause stimulus generation device 20 to adjust the intensity of the stimulus in accordance with the sleepiness level estimated by sleepiness estimator 141, even in a stopped state of a vehicle.

While an example has been shown in FIG. 9 that the intensity of the stimulus is classified in three stages of none (i.e., no stimulus), low, and high, the classification is not limited thereto. The intensity of the stimulus may be classified into weak and intense or may further include one or more levels. Using the example shown in FIG. 9, between the lower intensities of a stimulus, a more intense stimulus may be applied at the sleepiness level "3" than at the level "2". Similarly, between the higher intensities of a stimulus, a more intense stimulus may be applied at the sleepiness level "5" than at the level "4".

As shown in FIG. 9, when the vehicle is traveling and the sleepiness level is "1", "2", or "3", there is no need to apply a stimulus, since the sleepiness level is low or medium and the driver is not sleepy or a little sleepy. On the other hand, when the vehicle is traveling and the sleepiness level is "4" or "5", a weak stimulus is applied, the sleepiness level is high and the driver is very sleepy. Note that no intense stimulus is applied when the vehicle is traveling and the sleepiness level is "4" or "5", since such a stimulus causes no distraction of the driver and ensures the safety of the driver.

Like in Embodiment 1, stimulus controller 13 causes stimulus generation device 20 to generate a stimulus more intense than a stimulus generated when the vehicle is determined to be traveling, when vehicle state determiner 12 determines that the vehicle is stopped. Note that the types of stimuli and how to provide the intensity of a stimulus are similar to those in Embodiment 1 and the description thereof will thus be omitted. In this embodiment, stimulus controller 13 further causes stimulus generation device 20 to change the intensity of a stimulus in accordance with the start time period estimated by start time estimator 142.

Specifically, stimulus controller 13 cases stimulus generation device 20 to change the intensity of the stimulus being generated to the intensity applied when the vehicle is determined to be traveling, at a certain time before the start time period estimated by start time estimator 142. That is, stimulus controller 13 causes stimulus generation device 20 to generate an intense stimulus in a stopped state of the vehicle. However, at a certain time (e.g., 15 seconds) before the start time period, stimulus controller 13 causes stimulus generation device 20 to change the intensity of the stimulus to generate a weak stimulus.

Stimulus controller 13 may also cause stimulus generation device 20 to gradually decrease the intensity of the stimulus from a certain time before the estimated start time period to the start time period to reach, in the start time period, the intensity to the intensity applied when the vehicle is determined to be traveling. That is, stimulus controller 13 causes stimulus generation device 20 to generate an intense stimulus in a stopped state of the vehicle. However, stimulus controller 13 may cause stimulus generation device 20 to gradually decrease the intensity of the stimulus from a certain time before the start time period to generate a weak stimulus in the start time period.

In this manner, in this embodiment, stimulus controller 13 controls stimulus generation device 20 based on a result of determination by vehicle state determiner 12 and the start time period estimated by start time estimator 142.

Note that stimulus controller 13 may cause stimulus generation device 20 to change the intensity of the stimulus in accordance with the period from the time when vehicle state determiner 12 determines that the vehicle is stopped to the start time period estimated by start time estimator 142. For example, assume that the period from the time when vehicle state determiner 12 determines that the vehicle is stopped to the start time period estimated by start time estimator 142 is longer than a second threshold. In this case, stimulus controller 13 may cause stimulus generation device 20 to generate a stimulus (i.e., an intense stimulus) more intense than a stimulus generated when the period is shorter than or equal to the second threshold. That is, assume that the period in which the vehicle is stopped is long to some extent according to a result of determination by vehicle state determiner 12 and the start time period estimated by start time estimator 142. In this case, stimulus controller 13 may cause stimulus generation device 20 to generate an intense stimulus. In other words, assume that the period in which the vehicle is stopped is short to some extent according to a result of determination by vehicle state determiner 12 and the start time period estimated by start time estimator 142. In this case, stimulus controller 13 may cause stimulus generation device 20 to generate no intense stimulus or to generate a weak stimulus. Assume that the vehicle is stopped in a short time, that is, for example, a traffic light is red and stops the vehicle but immediately turns green and allows the vehicle to pass. In this case, no intense stimulus that tends to cause a distraction is applied to the driver, which further ensures the safety of the driver.

2.2. Operation of Awakening Support Device 10A

Now, an operation of awakening support device 10A described above will be described.

Figure 10:
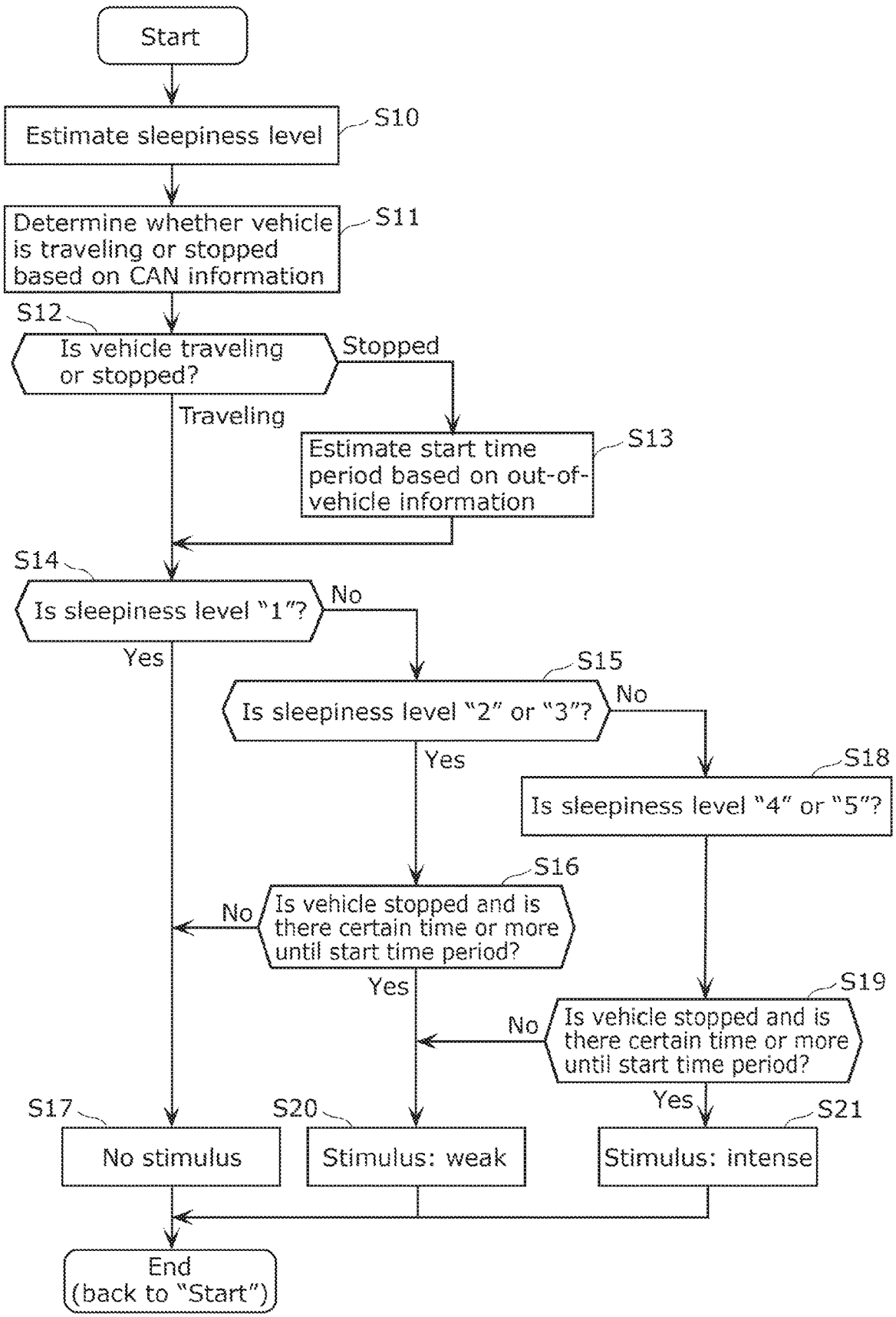
FIG. 10 is a flowchart showing an example operation of the awakening support device according to Embodiment 2.

FIG. 10 is a flowchart showing an example operation of awakening support device 10A according to Embodiment 2.

First, awakening support device 10A estimates the sleepiness level (S10). More specifically, sleepiness estimator 141 of awakening support device 10A estimates the sleepiness level indicating the degree of the sleepiness of the driver based on information on detection by sensors that detect the conditions of the driver.

Next, awakening support device 10A determines whether the vehicle of the driver is traveling or stopped based on CAN information (S11). More specifically, vehicle state determiner 12 of awakening support device 10A determines whether the vehicle of the driver is traveling or stopped based on CAN information, such as information indicating the vehicle speed, obtained from a network mounted on the vehicle.

Awakening support device 10A then checks whether the vehicle has been determined to be traveling or stopped in step S11 (S12). If the result of the check in step S12 shows that the vehicle has been determined to be stopped in step S11 ("Stopped" in S12), awakening support device 10A estimates a start time period based on out-of-vehicle information (S13). More specifically, for example, start time estimator 142 of awakening support device 10A estimates the start time period based on at least one of out-of-vehicle information of: information obtained from a traffic light in the travelling direction of the vehicle; information obtained from a railroad crossing in the travelling direction of the vehicle; or information on other vehicles in the travelling direction of the vehicle.

On the other hand, if the result of the check in step S12 shows that the vehicle has been determined to be traveling in step S11 ("Traveling" in S12), awakening support device 10A checks whether the sleepiness level estimated in step S10 is "1" (S14).

If the result of the check in step S14 shows that the sleepiness level estimated in step S10 is not "1" ("No" in S14), awakening support device 10A checks whether the sleepiness level estimated in step S10 is "2" or "3" (S15). If the result of the check in step S14 shows that the sleepiness level estimated in step S10 is "1" ("Yes" in S14), awakening support device 10A proceeds to step S17.

If the result of the check in step S15 shows that the sleepiness level estimated in step S10 is "2" or "3" ("Yes" in S15), awakening support device 10A further determines whether the vehicle is determined to be stopped and there is a certain time or more until the estimated start time period (S16).

Assume that it is determined in step S16 that the vehicle is not stopped and/or there is a time shorter than the certain time until the estimated start time period ("No" in S16). In this case, awakening support device 10A causes stimulus generation device 20 to generate no stimulus (S17). Note that awakening support device 10A proceeds to step S20, if it is determined in step S16 that the vehicle is stopped and there is the certain time or more until the estimated start time period ("Yes" in S16).

On the other hand, if the result of the check in step S15 shows that the sleepiness level estimated in step S10 is neither "2" nor "3" ("No" in S15), awakening support device 10A determines that the sleepiness level estimated in step S10 is "4" or "5" (S18).

After that, awakening support device 10A determines whether the vehicle has been determined to be stopped in step S11 and there is a certain time or more until the start time period estimated in step S13 (S19).

If it is determined in step S19 that the vehicle is not stopped and/or there is a time shorter than the certain time until the start time period ("No" in S19), awakening support device 10A causes stimulus generation device 20 to generate a weak stimulus (S20). If it is determined in step S19 that the vehicle is stopped or there is a certain time or more until the start time period ("Yes" in S19), awakening support device 10A causes stimulus generation device 20 to generate an intense stimulus (S21).

Figure 11:
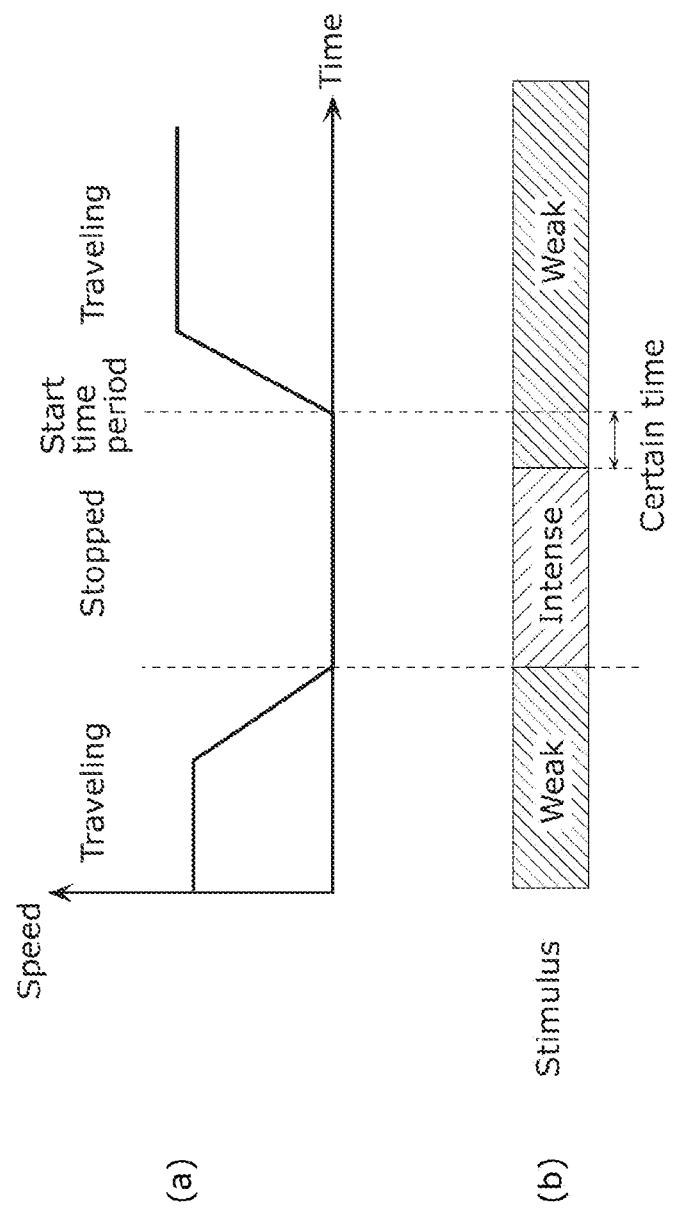
FIG. 11 is an illustration conceptually showing an operation of the awakening support device according to Embodiment 2.

FIG. 11 is an illustration conceptually showing an operation of awakening support device 10A according to Embodiment 2. Like in (a) of FIG. 5, (a) of FIG. 11 shows the states of the vehicle of the driver. The vertical axis represents the speed and the horizontal axis represents the time. The example shown in (a) of FIG. 11 will be described where a vehicle is stopped (in a stopped state) while the vehicle speed is zero, whereas the vehicle is traveling (in a traveling state) while the vehicle speed is not zero. In FIG. 11, (a) also shows the start time period estimated from out-of-vehicle information. In FIG. 11, (b) shows example intensities of a stimulus applied to the driver. Like in (b) of FIG. 5, a stimulus with an intensity that causes less distraction is shown as "weak", while a stimulus with an intensity that tends to cause a distraction is shown as "intense".

As shown in FIG. 11, in this embodiment, when the vehicle of the driver is traveling, a weak stimulus that causes less distraction can be applied to the driver. On the other hand, when the vehicle of the driver is stopped, a stimulus that has a high awakening effect and tends to cause a distraction can be applied to the driver until a certain time before the estimated start time period. Then, a stimulus that causes less distraction can be applied to the driver at the certain time, that is, immediately before the start.

Figure 12:
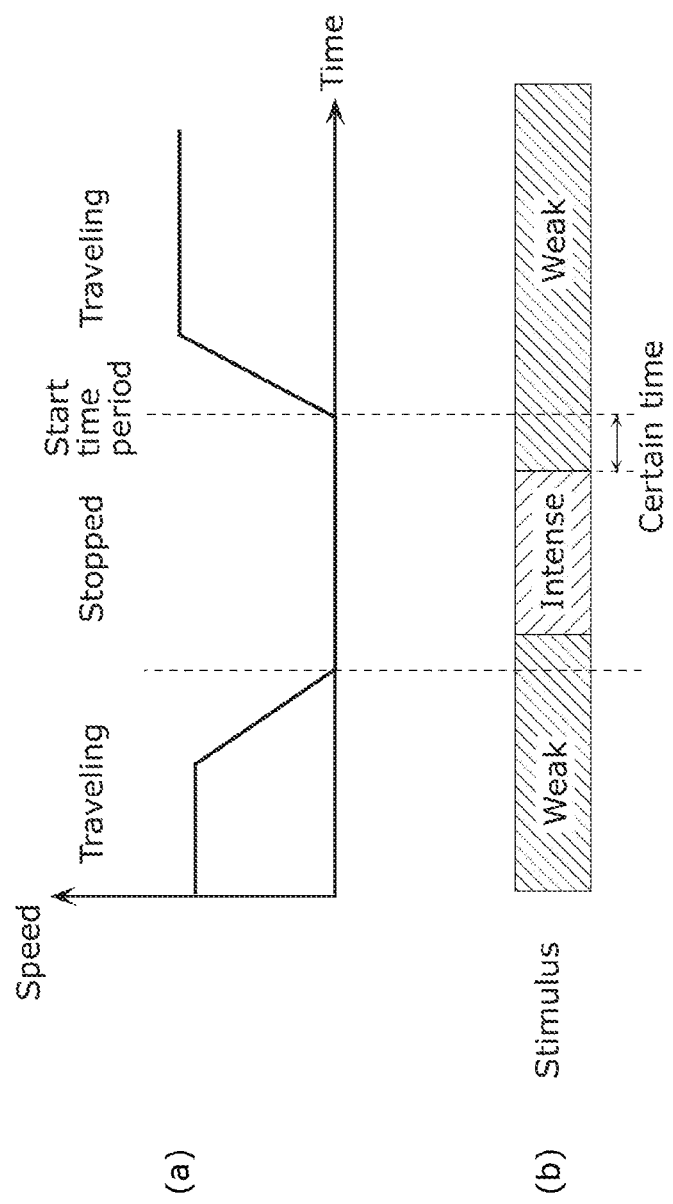
FIG. 12 is an illustration conceptually showing another example operation of the awakening support device according to Embodiment 2.

FIG. 12 is an illustration conceptually showing another example operation of awakening support device 10A according to Embodiment 2. The same reference signs are used to represent equivalent elements to those in (a) and (b) of FIG. 11 and detailed description thereof will be omitted.

Specifically, in FIG. 11 described above, a stimulus that has a high awakening effect and tends to cause a distraction is applied to the driver immediately after the vehicle of the driver has been stopped. On the other hand, in the example shown in FIG. 12, a stimulus that has a high awakening effect and tends to cause a distraction can be applied to the driver from a certain time after the vehicle of the driver has been stopped.

In this manner, when vehicle state determiner 12 determines that the vehicle is stopped, stimulus controller 13 according to Embodiment 2 may cause stimulus generation device 20 to generate an intense stimulus after a certain time since the vehicle has stopped.

2.3. Advantageous Effects of Embodiment

As described above, awakening support device 10A according to this embodiment applies a weak stimulus that causes less distraction to the driver in a traveling state of the vehicle of the driver.

Accordingly, when the vehicle of the driver is traveling, no intense stimulus that tends to cause a distraction is applied to the driver, which can ensure the safety of the driver.

On the other hand, awakening support device 10A according to this embodiment applies a stimulus that has a high awakening effect and tends to cause a distraction to a driver until a certain time before the estimated start time period, when the vehicle of the driver is stopped. Awakening support device 10A then applies a weak stimulus that causes less distraction to the driver at the certain time, that is, immediately before the start.

Accordingly, awakening support device 10A can not only effectively promote the awakening of the driver when the vehicle is stopped, but also further ensure the safety when the driver starts driving the vehicle, because the driver is less distracted. In this manner, a further improvement can be expected in the awakening support device, for example, according an embodiment of the present disclosure.

Variation 1

While an example has been described above in Embodiment 2 that a certain time before the start time period is a fixed time, such as 15 seconds, the certain time is not limited thereto. The certain time may vary depending on the conditions of the driver, the surrounding environment of the vehicle, or other factors, or may vary depending on the type of a stimulus for use, the intensity of the stimulus, or other factors. Such a case will be described below as Variation 1. Note that differences from the description in Embodiment 2 will be described mainly.

3.1. Configuration

Awakening support device 10A according to Variation 1 includes stimulus controller 13 performing a different operation and estimator 14A with a different configuration from those in awakening support device 10A according to Embodiment 2.

3.1.1. Estimator 14A according to Variation 1

Figures 13, 14:
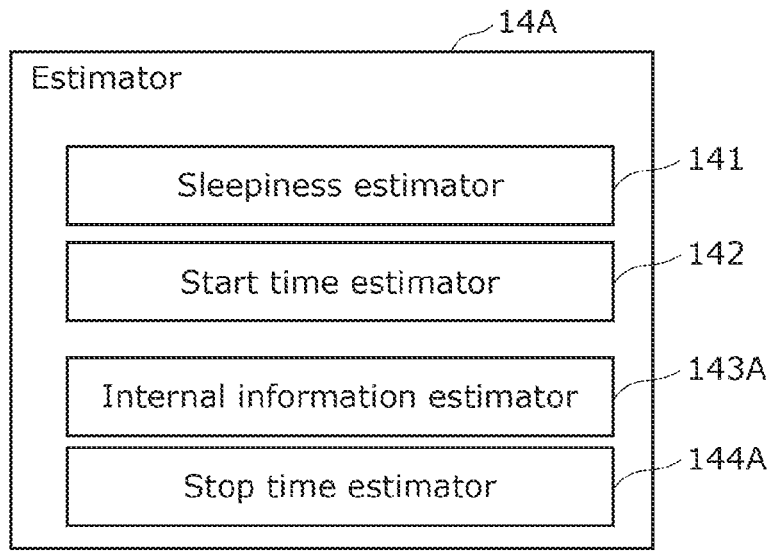
FIG. 13 shows an example configuration of an estimator according to Variation 1 of Embodiment 2.
FIG. 14 shows example times set to a certain time before a start time period according to Variation 1 of Embodiment 2.

FIG. 13 shows an example configuration of estimator 14A according to Variation 1 of Embodiment 2. The same reference signs are used to represent equivalent elements to those in FIG. 8 and detailed description thereof will be omitted.

Estimator 14A shown in FIG. 13 includes the configurations of internal information estimator 143A and stop time estimator 144A in addition to estimator 14 shown in FIG. 8.

Internal information estimator 143A estimates internal information indicating the conditions of the driver. In this variation, internal information estimator 143A estimates internal information indicating the conditions of the driver, such as the degree of concentration or distraction of the driver or the stress level of the driver, based on the biological information obtained by obtainer 11. Internal information estimator 143A estimates the degree of concentration or distraction of the driver or the stress level of the driver based on biological information indicating the gaze track, the pulse of the driver, or the posture of the driver, for example.

When vehicle state determiner 12 determines that the vehicle is traveling, stop time estimator 144A estimates a stop time when the vehicle is to be stopped. In this variation, stop time estimator 144A estimates the stop time when a traveling vehicle stops based on the out-of-vehicle information obtained by obtainer 11 and CAN information. Stop time estimator 144A estimates that the stop time is in three seconds, for example, when a traffic light in the travelling direction of the vehicle turns red and the vehicle reaches the stop line of the traffic light in three seconds.

3.1.2. Stimulus Controller 13 according to Variation 1

In addition to the various functions described above in Embodiment 2, stimulus controller 13 may change a certain time before a start time period in accordance with the conditions of the driver, the surrounding environment of the vehicle, or other factors, or in accordance with the type of a stimulus for use, the intensity of the stimulus, or other factors.

For example, stimulus controller 13 may change the length of the certain time before a start time period in accordance with the degree of concentration of the driver indicated by the internal information obtained by estimation by internal information estimator 143A.

Stimulus controller 13 may change the length of the certain time before a start time period based on the surrounding environment information obtained from the surrounding environment of the vehicle.

FIG. 14 shows example times set to the certain time before a start time period according to Variation 1 of Embodiment 2.

An example is shown in FIG. 14 where the default value of the time set to the certain time before a start time period is 15 seconds.

FIG. 14 shows that the time set to the certain time before a start time period is ten seconds, which is shorter than the default value, for example, when an intense stimulus is applied to the driver in accordance with the sleepiness level in a stopped state of the vehicle. On the other hand, the figure shows that the time set to the certain time before a start time is three seconds, which is shorter than when an intense stimulus is applied, when a weak stimulus is applied to the driver in a stopped state of the vehicle.

FIG. 14 also shows that the time set to the certain time before a start time period varies in accordance with the type of a stimulus applied to the driver in a stopped state of the vehicle. The figure shows that the time set to the certain time before a start time period is 15 seconds, which is equal to the default value, for example, when a stimulus is applied in the form of an aroma or light, and is ten seconds, which is shorter than the default value, when a stimulus is applied in a form other than an aroma or light.

FIG. 14 also shows that the time set to the certain time before a start time period varies in accordance with external information obtained from surrounding information such as the traffic, the size of a blind spot, or an accident rate.

Similarly, FIG. 14 shows that the time set to the certain time before a start time period varies in accordance with internal information such as the degree of distraction or stress.

In this variation, stimulus controller 13 may further change the intensity of the stimulus to be generated by stimulus generation device 20 in accordance with the stop time estimated by stop time estimator 144A. More specifically, for example, stimulus controller 13 may change the intensity of the stimulus to be generated by stimulus generation device 20 in accordance with the length of the time until the stop time estimated by stop time estimator 144A. For example, when the length of the time until the stop time estimated by stop time estimator 144A is shorter than a third threshold, stimulus controller 13 may cause stimulus generation device 20 to generate a stimulus more intense than a stimulus generated when the time until the stop time is longer than or equal to the third threshold. In a conceivable case, there is no safety problem to apply an intense stimulus that tends to cause a distraction to the driver from a time immediately before the stop time, when stopped and short traveling states alternate like in a traffic jam. In such a case, a stimulus with a weak intensity that causes less distraction may be changed immediately before the stop time to generate a stimulus that tends to cause a distraction, that is, a stimulus (i.e., an intense stimulus) with an intensity that tends to cause a distraction.

3.2. Advantageous Effects

As described above, awakening support device 10A according to this variation may change the length of the certain time before a start time period in accordance with the conditions of the driver, the surrounding environment of the vehicle, or other factors, or in accordance with the type of a stimulus for use, the intensity of the stimulus, or other factors.

Accordingly, awakening support device 10A can not only effectively promote the awakening of a driver in accordance with the conditions of the driver, the surrounding environment of the vehicle, the type of a stimulus for use, the intensity of the stimulus, or other factors, when a vehicle is stopped, but also cause less distraction, when the driver starts driving the vehicle. Accordingly, awakening support device 10A can effectively promote the awakening of the driver, while further ensuring the safety. In this manner, a further improvement can be expected in the awakening support device, for example, according an embodiment of the present disclosure.

Other Possible Embodiments

For example, an awakening support device according to the present disclosure promotes awakening of a driver. The awakening support device includes: a vehicle state determiner that determines whether a vehicle of the driver is traveling or stopped; and a stimulus controller that controls a stimulus generation device that generates a stimulus used for supporting the awakening of the driver based on a result of determination by the vehicle state determiner. When the vehicle state determiner determines that the vehicle is stopped, the stimulus controller causes the stimulus generation device to generate a first stimulus more intense than a second stimulus generated when the vehicle is determined to be traveling.

In this manner, the awakening support device applies a weak stimulus that causes less distraction to the driver in a traveling state of the vehicle of the driver. On the other hand, the awakening support device applies an intense stimulus that tends to cause a distraction but has a high awakening effect to the driver in a stopped state of the vehicle of the driver. Accordingly, when the vehicle of the driver is traveling, the awakening support device applies no intense stimulus that tends to cause a distraction to the driver, which can ensure the safety of the driver. On the other hand, when the vehicle of the driver is stopped, the awakening support device applies a stimulus that has a high awakening effect and tends to cause a distraction to the driver, which can effectively promote the awakening of the driver.

The awakening support device may further include: a sleepiness estimator that estimates a sleepiness level indicating a degree of sleepiness of the driver based on information on detection by a sensor that detects a condition of the driver. The stimulus controller may change an intensity of the stimulus to be generated by the stimulus generation device in accordance with the sleepiness level estimated by the sleepiness estimator.

Here, for example, the stimulus controller may cause the stimulus generation device to generate: the stimulus, when the sleepiness level estimated by the sleepiness estimator is higher than a first threshold; a stimulus with a first intensity, when the sleepiness level is estimated to be higher than the first threshold and the vehicle is determined to be traveling; and a stimulus more intense than the stimulus with the first intensity applied when the vehicle is determined to be traveling, when the sleepiness level is estimated to be higher than the first threshold and the vehicle is determined to be stopped.

With this configuration, when the driver is not sleepy, there is no need for the awakening support device to apply a stimulus that has a high awakening effect and tends to cause a distraction to the driver even in a stopped state of the vehicle, which can further ensure the safety.

The awakening support device may further include: a start time estimator that estimates a start time period of the vehicle, when the vehicle state determiner determines that the vehicle is stopped. The stimulus controller may cause the stimulus generation device to change an intensity of the stimulus in accordance with the start time period estimated by the start time estimator.

Here, for example, at a certain time before the start time period estimated by the start time estimator, the stimulus controller may cause the stimulus generation device to change the intensity of the stimulus to the intensity applied when the vehicle is determined to be traveling.

For example, from a certain time before the start time period estimated by the start time estimator to the start time period, the stimulus controller may cause the stimulus generation device to gradually decrease the intensity of the stimulus to reach, in the start time period, the intensity applied when the vehicle is determined to be traveling.

With these configurations, when the vehicle of the driver is traveling, the awakening support device applies no intense stimulus that tends to cause a distraction to the driver, which ensures the safety of the driver. The awakening support device not only effectively promotes the awakening of the driver when the vehicle is stopped, but also causes less distraction at the time when the driver starts driving the vehicle, which can further ensure the safety.

The stimulus controller may change a length of the certain time in accordance with a concentration of the driver.

The stimulus controller may change a length of the certain time based on surrounding environment information obtained from a surrounding environment of the vehicle.

With these configurations, the awakening support device not only effectively promotes the awakening of the driver in accordance with the conditions of the driver, the surrounding environment of the vehicle, or other factors when the vehicle is stopped, but also causes less distraction at the time when the driver starts driving the vehicle. Accordingly, the awakening support device can effectively promote the awakening of the driver, while further ensuring the safety.

The stimulus controller may cause the stimulus generation device to change the intensity of the stimulus in accordance with a period from when the vehicle state determiner determines that the vehicle is stopped until the start time period estimated by the start time estimator.

Here, when the period from when the vehicle state determiner determines that the vehicle is stopped until the start time period estimated by the start time estimator is longer than a second threshold, the stimulus controller may cause the stimulus generation device to generate a stimulus more intense than a stimulus generated when the period is shorter than or equal to the second threshold.

With these configurations, there is no need to generate an intense stimulus in a stopped state of the vehicle for a shorter time. Accordingly, when the vehicle is stopped for a short time, for example, a traffic light is red to stop the vehicle but immediately turns green and allows the vehicle to pass, no intense stimulus that tends to cause a distraction is applied to the driver, which can further ensure the safety of the driver.

Note that the start time estimator may estimate the start time period of the vehicle based on at least one of information obtained from a traffic light in a travelling direction of the vehicle, information obtained from a railroad crossing in the travelling direction of the vehicle, or information on another vehicle in the travelling direction of the vehicle.

In this manner, the start time period of the vehicle can be estimated.

The awakening support device may further include a stop time estimator that estimates a stop time when the vehicle is to be stopped, when the vehicle state determiner determines that the vehicle is traveling. The stimulus controller may change an intensity of the stimulus to be generated by the stimulus generation device in accordance with the stop time estimated by the stop time estimator.

Here, for example, the stimulus controller may change the intensity of the stimulus to be generated by the stimulus generation device in accordance with a time until the stop time estimated by the stop time estimator.

For example, when the time until the stop time estimated by the stop time estimator is shorter than a third threshold, the stimulus controller may cause the stimulus generation device to generate a stimulus more intense than a stimulus generated when the time until the stop time is longer than or equal to the third threshold.

With these configurations, in a predetermined scene, the awakening support device can apply an intense stimulus that tends to cause a distraction to the driver from a time immediately before the stop time. This is because there is no safety problem to apply an intense stimulus that tends to cause a distraction to the driver from a time immediately before the stop time, when stopped and short traveling states alternate like in a traffic jam. Accordingly, the awakening support device can effectively promote the awakening of the driver, while further ensuring the safety.

When the vehicle state determiner determines that the vehicle is stopped, the stimulus controller may cause the stimulus generation device to generate a stimulus more intense than a stimulus generated when the vehicle is determined to be traveling after a certain time since the vehicle has stopped.

With this configuration, the awakening support device not only effectively promotes the awakening of the driver when the vehicle is stopped, but also causes less distraction at the time when the driver starts driving the vehicle, which can further ensure the safety.

For example, when the vehicle state determiner determines that the vehicle is stopped, the stimulus controller may cause the stimulus generation device to gradually increase an intensity of the stimulus from an intensity applied when the vehicle is determined to be traveling to an intensity applied when the vehicle is determined to be stopped.

For example, the stimulus controller may change an intensity of the stimulus by changing a type of the stimulus to be generated by the stimulus generation device.

For example, the stimulus may be at least one of a blow, a sound, a vibration, an aroma, or light.

For example, generating the first stimulus may be notifying the driver of a need to perform a predetermined operation and causing the driver to perform the predetermined operation.

Accordingly, an active operation that stimulates the five senses of the driver can be used as an intense stimulus.

An awakening support method according to the present disclosure is a method of promoting awakening of a driver. The awakening support method includes: determining whether a vehicle of the driver is traveling or stopped; and causing a stimulus generation device to generate a stimulus used for supporting the awakening of the driver based on a result of determination in the determining. The causing includes causing the stimulus generation device to generate a stimulus more intense than a stimulus generated when the vehicle is determined to be traveling, when the vehicle is determined to be stopped in the determining.

Accordingly, the method not only effectively promotes the awakening of the driver when the vehicle is stopped, but also causes less distraction at the time when the driver starts driving the vehicle, which can further ensure the safety.

While the awakening support device and the awakening support method according to an aspect of the present disclosure have been described above based on the embodiments and variation, the present disclosure is not limited to these embodiments and variation. The present disclosure may include forms obtained by various modifications to the foregoing embodiments and variation that can be conceived by those skilled in the art or forms achieved by freely combining the constituent elements and functions in the foregoing embodiments and variation.

The present disclosure also includes the following cases.

(1) The present disclosure has been described as follows. A weak stimulus that causes less distraction is applied to the driver in a traveling state of the vehicle of the driver. On the other hand, an intense stimulus that tends to cause a distraction but has a high awakening effect is applied to the driver in a stopped state of the vehicle of the driver. In the present disclosure, a driver may be notified in the form of a sound, a lamp, or a display under the current conditions (e.g., the intensity or the type) of applying the stimulus to the driver. When conducting the application of a stimulus to a driver or changing the conditions, the driver may be notified in advance in the form of a sound, a lamp, or a display.

(2) The devices described above can be, specifically, each a computer system including a microprocessor, a read-only memory (ROM), a random-access memory (RAM), a hard disk unit, a display unit, a keyboard, a mouse, and other components. The RAM or the hard disk unit stores computer programs. The microprocessor operates in accordance with the computer programs so that the devices fulfil their functions. Here, the computer programs are obtained by combining a plurality of command codes indicating instructions to the computer to fulfil predetermined functions.

(3) Some or all of the components of the devices may serve as a single system large-scale integrated (LSI) circuit. The system LSI circuit is a super multifunctional LSI circuit manufactured by integrating a plurality of components on a single chip, and specifically is a computer system including a microprocessor, a ROM, and a RAM, for example. The ROM stores computer programs. The microprocessor loads the computer programs from the ROM to the RAM and performs calculations or other operations in accordance with the loaded computer programs so that the system LSI fulfils its functions.

(4) The present disclosure may be achieved by the method described above. Such a method may be implemented as a computer program executed by a computer or digital signals according to a computer program.

Specifically, a program according to an aspect of the present disclosure causes a computer to execute an awakening support method that promotes awakening of a driver. The program causes the computer to execute: determining whether a vehicle of the driver is traveling or stopped; and causing a stimulus generation device to generate a stimulus used for supporting the awakening of the driver based on a result of determination in the determining. The causing includes causing the stimulus generation device to generate a stimulus more intense than a stimulus generated when the vehicle is determined to be traveling, when the vehicle is determined to be stopped in the determining.

The present disclosure may be directed to a computer program or digital signals stored in a computer-readable recoding medium such as a flexible disk, a hard disk, a CD-ROM, a magneto-optical (MO) disc, a digital versatile disc (DVD), a DVD-ROM, a DVD-RAM, a Blu-ray Disc (BD), or a semiconductor memory.

The present disclosure may be directed to a computer program or digital signals transmitted via telecommunications lines, wireless or wired communication lines, networks represented by the Internet, data broadcasting, and other communication means.

The present disclosure may also be directed to a computer system including a microprocessor and a memory. The memory may store computer programs, and the microprocessor may operate in accordance with the computer programs.

A program or digital signals may be recorded in a recording medium and transferred, or transferred via a network, for example, and then executed by another independent computer system.

(5) The embodiments and variation described above may be combined.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims are incorporated herein by reference in their entirety: Japanese Patent Application No. 2021-212886 filed on Dec. 27, 2021.

INDUSTRIAL APPLICABILITY

The present disclosure is usable as an awakening support device and an awakening support method, particularly as an awakening support device and an awakening support method for effectively supporting the awakening of a driver of a vehicle, while ensuring the safety.

The invention claimed is:

1. An awakening support device that promotes awakening of a driver, the awakening support device comprising:
   a vehicle state determiner that determines whether a vehicle of the driver is traveling or stopped; and
   a stimulus controller that controls a stimulus generation device that generates a stimulus used for supporting the awakening of the driver based on a result of the determination by the vehicle state determiner, wherein
   when the vehicle state determiner determines that the vehicle is stopped, the stimulus controller causes the stimulus generation device to generate a first stimulus more intense than a second stimulus generated when the vehicle is determined to be traveling.

2. The awakening support device according to claim 1, further comprising:
   a sleepiness estimator that estimates a sleepiness level indicating a degree of sleepiness of the driver based on information detected by a sensor that detects a condition of the driver, wherein
   the stimulus controller changes an intensity of the stimulus to be generated by the stimulus generation device in accordance with the sleepiness level estimated by the sleepiness estimator.

3. The awakening support device according to claim 2, wherein
   the stimulus controller causes the stimulus generation device to generate:
   the stimulus, when the sleepiness level estimated by the sleepiness estimator is higher than a first threshold;
   a stimulus with a first intensity, when the sleepiness level is estimated to be higher than the first threshold and the vehicle is determined to be traveling; and
   a stimulus more intense than the stimulus with the first intensity applied when the vehicle is determined to be traveling, when the sleepiness level is estimated to be higher than the first threshold and the vehicle is determined to be stopped.

4. The awakening support device according to claim 1, further comprising:
   a start time estimator that estimates a start time period of the vehicle, when the vehicle state determiner determines that the vehicle is stopped, wherein
   the stimulus controller causes the stimulus generation device to change an intensity of the stimulus in accordance with the start time period estimated by the start time estimator.

5. The awakening support device according to claim 4, wherein
   at a certain time before the start time period estimated by the start time estimator, the stimulus controller causes the stimulus generation device to change the intensity of the stimulus to the intensity applied when the vehicle is determined to be traveling.

6. The awakening support device according to claim 4, wherein
from a certain time before the start time period estimated by the start time estimator to the start time period, the stimulus controller causes the stimulus generation device to gradually decrease the intensity of the stimulus to reach, in the start time period, the intensity applied when the vehicle is determined to be traveling.

7. The awakening support device according to claim 5, wherein
   the stimulus controller changes a length of the certain time in accordance with a concentration of the driver.

8. The awakening support device according to claim 5, wherein
   the stimulus controller changes a length of the certain time based on surrounding environment information obtained from a surrounding environment of the vehicle.

9. The awakening support device according to claim 4, wherein
   the stimulus controller causes the stimulus generation device to change the intensity of the stimulus in accordance with a period from when the vehicle state determiner determines that the vehicle is stopped until the start time period estimated by the start time estimator.

10. The awakening support device according to claim 9, wherein
    when the period from when the vehicle state determiner determines that the vehicle is stopped until the start time period estimated by the start time estimator is longer than a second threshold, the stimulus controller causes the stimulus generation device to generate a stimulus more intense than a stimulus generated when the period is shorter than or equal to the second threshold.

11. The awakening support device according to claim 4, wherein
    the start time estimator estimates the start time period of the vehicle based on at least one of information obtained from a traffic light in a travelling direction of the vehicle, information obtained from a railroad crossing in the travelling direction of the vehicle, or information obtained on another vehicle in the travelling direction of the vehicle.

12. The awakening support device according to claim 1, further comprising:
    a stop time estimator that estimates a stop time when the vehicle is to be stopped, when the vehicle state determiner determines that the vehicle is traveling, wherein
    the stimulus controller changes an intensity of the stimulus to be generated by the stimulus generation device in accordance with the stop time estimated by the stop time estimator.

13. The awakening support device according to claim 12, wherein
    the stimulus controller changes the intensity of the stimulus to be generated by the stimulus generation device in accordance with a time until the stop time estimated by the stop time estimator.

14. The awakening support device according to claim 13, wherein
    when the time until the stop time estimated by the stop time estimator is shorter than a third threshold, the stimulus controller causes the stimulus generation device to generate a stimulus more intense than a stimulus generated when the time until the stop time is longer than or equal to the third threshold.

15. The awakening support device according to claim 1, wherein when the vehicle state determiner determines that the vehicle is stopped, the stimulus controller causes the stimulus generation device to generate a stimulus more intense than a stimulus generated when the vehicle is determined to be traveling after a certain time since the vehicle has stopped.

16. The awakening support device according to claim 1, wherein
when the vehicle state determiner determines that the vehicle is stopped, the stimulus controller causes the stimulus generation device to gradually increase an intensity of the stimulus from an intensity applied when the vehicle is determined to be traveling to an intensity applied when the vehicle is determined to be stopped.

17. The awakening support device according to claim 1, wherein
the stimulus controller changes an intensity of the stimulus by changing a type of the stimulus to be generated by the stimulus generation device.

18. The awakening support device according to claim 1, wherein
the stimulus is at least one of a blow, a sound, a vibration, an aroma, or light.

19. The awakening support device according to claim 1, wherein
generating the first stimulus is notifying the driver of a need to perform a predetermined operation and causing the driver to perform the predetermined operation.

20. An awakening support method of promoting awakening of a driver, the awakening support method comprising:
determining whether a vehicle of the driver is traveling or stopped; and
causing a stimulus generation device to generate a stimulus used for supporting the awakening of the driver based on a result of the determination in the determining, wherein
the causing includes causing the stimulus generation device to generate a stimulus more intense than a stimulus generated when the vehicle is determined to be traveling, when the vehicle is determined to be stopped in the determining.

* * * * *